United States Patent [19]

Klimowicz

[11] 4,266,460

[45] May 12, 1981

[54] MULTIPLE PIECE BOLT-TYPE FASTENER

[76] Inventor: Jerome R. Klimowicz, 3827 W. LeGrande Blvd. 103 N., Mequon, Wis. 53092

[21] Appl. No.: 47,268

[22] Filed: Jun. 11, 1979

[51] Int. Cl.³ .................. F16B 23/00; F16B 35/00
[52] U.S. Cl. ........................... 411; 10/27 R; 397
[58] Field of Search ............... 85/9 R, 9 W, 35, 8.3, 85/7; 151/5, 6; 10/27 R

[56] References Cited

U.S. PATENT DOCUMENTS

| 840,249 | 1/1907 | Patton | 151/5 |
| 2,810,139 | 10/1957 | Plagemann | 85/9 R X |
| 3,468,211 | 9/1969 | Suan | 10/27 R X |

FOREIGN PATENT DOCUMENTS

| 715793 | 8/1965 | Canada | 85/9 R |
| 756524 | 9/1933 | France | 85/9 R |
| 952616 | 5/1949 | France | 151/5 |
| 491041 | 2/1930 | German Democratic Rep. | 151/6 |

*Primary Examiner*—Ramon S. Britts
*Attorney, Agent, or Firm*—Andrus, Sceales, Starke & Sawall

[57] ABSTRACT

A bolt is fabricated from an elongated threaded rod by severing the rod along a planar surface angularly oriented with respect to a diametrical plane through the rod. A cup-shaped nut, having aligned openings in the sidewalls adjacent the outer base thereof, is threaded onto the severed end of the rod with the base adjacent the end of the rod. The aligned openings extend across the inclined surface adjacent the outer end of the rod. After the nut is threaded onto the rod, a pin is forced onto one of the openings. The pin is located immediately adjacent to the inclined surface of the rod thereby affecting a positive interconnection of the head to the rod and completing the fastener bolt.

11 Claims, 5 Drawing Figures

U.S. Patent
May 12, 1981
4,266,460
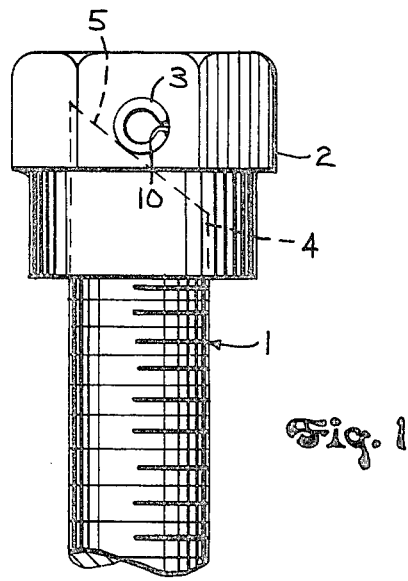
Fig. 1
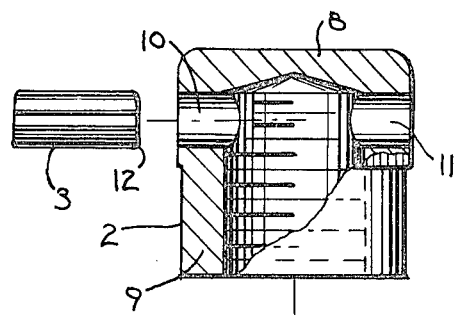
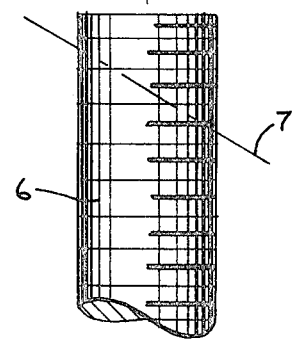
Fig. 2
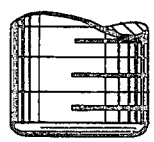
Fig. 5
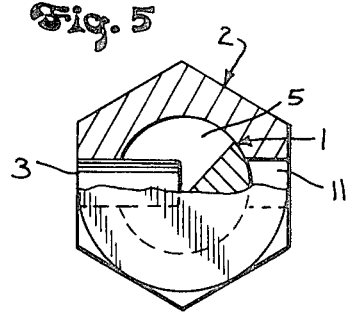
Fig. 3
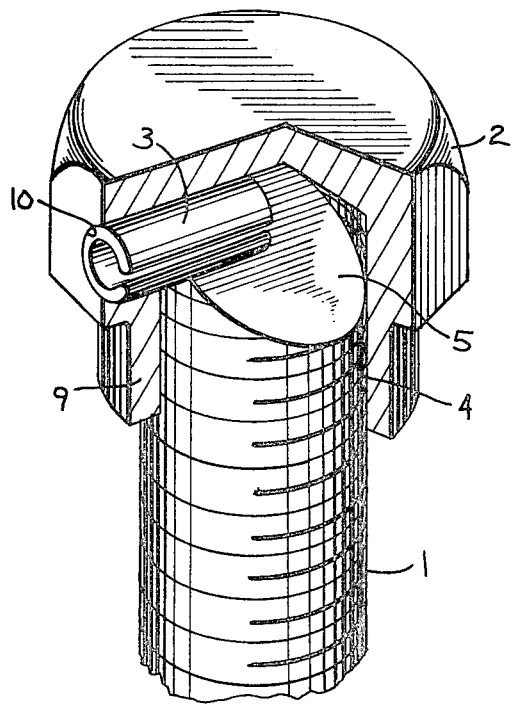
Fig. 4
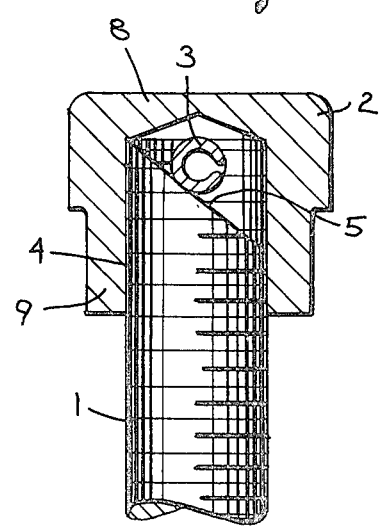

MULTIPLE PIECE BOLT-TYPE FASTENER

BACKGROUND OF THE INVENTION

This invention relates to a multiple bolt-type fastener and to the method of fabrication of such a fastener.

Bolt-type fasteners having a threaded shank and an integral head are widely used for interconnection and fastening of elements to each other. A twist or turning force is, of course, applied to the head for insertion and removal of the fastener. Fastening bolts are manufactured in many different lengths, but generally only the shorter length bolts are immediately available. Although certain suppliers may stock various long sizes of particular bolts, longer bolts are not generally and conveniently available on demand, particularly for the small user such as the retail purchaser.

The prior art includes suggestions for forming a bolt-type fastener from an elongated threaded rod, which is generally available in lengths substantially greater than three inches. The rod is cut to an appropriate size and a head permanently fixed to the one end. For example, U.S. Pat. No. 2,180,139 which issued in 1957 and U.S. Pat. No. 3,468,211 which issued Sept. 23, 1969 both disclose an axially inserted locking element introduced from the outer end of the rod into the nut to lock it to a stud or rod member and thereby form a threaded bolt-type fastener. U.S. Pat. No. 3,468,211 also notes the use of such structure may be advantageous where the shank or head must be of a special material. Thus, if a hardened, high strength shank is desired, the separate shank and head may provide an efficient and easier mode of manufacture. The prior art systems, however, require use of a nut with access to the end of the interconnected rod and nut, can not be easily incorporated into a socket drive head, and produce a connection of limited strength. Further, the assembly and fabrication of the rod and nut into the integrated fastener requires rather skilled technique to insure a firm reliable connection.

SUMMARY OF THE PRESENT INVENTION

The present invention is particularly directed to an improved multiple piece bolt-type fastener and to the method of fabricating such fastener, which can be readily carried out with conventional tooling to create a high strength interconnection between the several components. Generally, in accordance with the teaching of the present invention, an appropriately threaded rod member is cut to a desired length, with the cut end specially formed to define an offset surface extended across the end of the rod. A drive head is threaded onto the special shaped end. The drive head is provided with a lateral opening, and is applied with the opening aligned with the removed portion of the specially-shaped removed end. A locking member is inserted into the opening into overlying relationship to the specially shaped end, and thereby interlocks the head to the rod and creates a bolt-type fastener. In a particularly unique and practical implementation of the present invention, an elongated threaded rod is severed along a planar surface angularly oriented with respect to a diametrical plane through the rod. A cup-shaped nut, having aligned openings in the sidewalls adjacent the outer base thereof, is threaded onto the severed end of the rod with the base adjacent the end of the rod. The opening extends across the inclined surface adjacent the outer end of the rod. A pin is forced into at least one of the openings to firmly and fixedly interconnect the pin in place. The pin is located within the head immediately adjacent to the inclined surface of the rod thereby affecting a positive interconnection of the head to the rod and completing the fastener bolt. The combination of the inclined surface and the lateral locking pin provides a simple and reliable connection of the head to the shank while simultaneously producing a high strength interconnection therebetween.

DESCRIPTION OF THE DRAWING FIGURES

The drawing furnished herewith generally illustrates the best mode presently contemplated for the invention and is described hereinafter.

In the drawing:

FIG. 1 is an elevational view of a bolt constructed in accordance with the present invention;

FIG. 2 is an exploded view of bolt parts for fabrication of the bolt shown in FIG. 1, with parts broken away and sectioned;

FIG. 3 is a pictorial view of the bolt with parts broken away and sectioned;

FIG. 4 is an axial section through the bolt; and

FIG. 5 is a view from the head end of the bolt with parts broken away and sectioned.

DESCRIPTION OF ILLUSTRATED EMBODIMENT

Referring to the drawings and particularly to FIG. 1, a bolt unit constructed in accordance with the teaching of the present invention is illustrated including a shank 1 to which an outer cup-shaped drive head or nut 2 is firmly interconnected by a laterally extending pin 3. As most clearly shown in FIGS. 3 and 4, shank 1 is threaded into the nut 2 as at 4. The innermost end of the shank 1 is provided with an inclined end face or surface 5 within nut 2. Pin 3 extends into the side of nut 2 and across the inclined surface. The threaded connection 4 may secure the head to shank 1 when a first turning force is applied to nut 2. The pin 3 and surface 5 firmly interlock nut 2 to the shank 1 with either turning force applied, providing a conventional bolt-type operation. Thus, applying a turning force to the nut 2 in one direction causes the nut 2 to tighten onto the shank 1 thereby providing a firm interconnection therebetween. Rotation forces applied in an opposite or loosening direction to the nut 2 moves the connecting pin 3 into engagement with the inclined surface 5 of the rod and thereby transmits the forces in the same manner as if the head were rigidly or integrally interconnected and fixed to the rod.

More particularly, in the fabrication of a bolt unit as shown in FIG. 1, the shank 1 is formed from a suitable threaded rod 6 of the indefinite length, as shown in FIG. 2. The rod 6 may be any standard threaded rod such as available in a hardware store, a distributor of industrial products and the like. Relatively long threaded rods are readily available of a conventional material, and may be available or formed of special materials. After the separate formation of the rod and the nut, the bolt length is determined. The threaded rod is cut along an inclined plane, as shown by the phantom line illustration 7, thereby forming and defining the end clamp surface 5.

The nut 2 is illustrated as a conventional cup-shaped member having a closed outer end or base wall 8 and an internally threaded annular sidewall 9. The internal threads of the nut 2 correspond to the external threads of rod 6. Pin receiving openings 10 and 11 are provided in aligned opposed portions of the sidewall 9 immediately inwardly of the base wall 8. The openings 10 and 11 may be readily formed in the fabrication of nut 2, or, subsequently, formed in an existing head such as by use of a conventional drill.

The nut 2, as rod 6, may be a conventional readily available nut or may be specially formed, as required. After appropriately cutting of the rod 6 and providing of an appropriate nut 2, the nut 2 is threaded onto the rod 6 until the base wall 8 is adjacent the end 5 of rod 6, with the openings 10 and 11 extending across and immediately adjacent the removed end portion of the rod 6. The pin 3, which is preferably a conventional split roll-pin, is then inserted into either one of the openings 10 and 11 using any suitable tool such as a hammer, a pressure forcing clamp or the like. The pin 3 need only be inserted approximately ⅛ to ½ of the maximum length into the head or nut 2. However, a pin of appropriate length may be extended through both openings. However, openings 10 and 11 must be aligned and the nut properly oriented to expose both openings. With the nut turned fully onto the rod the one head opening 10 may be totally or partially blocked by the inclined rod end with only the opposite opening 11 open; for example, as shown in FIG. 5. The nut could, of course, be reoriented to expose both openings by only partial turning of the head onto the rod. The maximum threaded connection is, however, desired. The use of the shorter pin 3 projecting substantially into the head provides a high strength connection which permits full thread engagement between the head and rod. Although some slight adjustment may be required, even with the shorter pin, the degree is trival and essentially full thread engagement may be maintained.

When the nut 2 is threaded onto the rod 6, one of the openings 10 or 11 may be partially closed by the innermost portion of the rod. The other opening is then totally or almost totally exposed such that only minimal, if any, movement of the nut is required to permit insertion of the pin 3. The pin 3 may also be provided with a slight taper to accommodate slight misalignment. The pin 3 moves through opening 10, for example, and is aligned over the inclined end 7 of rod 6. The pin 3 preferably is formed to establish a firm press fit to maintain the desired fixed interconnection, while providing a simple and inexpensive method of assembly.

As a result of such fabrication, the turning forces applied to the head 2 of the finished bolt will be transmitted to the shank 1 in accordance with conventional practice.

Various modifications can, of course, be made. The nut need not be formed with an outer base portion and the pin or other locking member, for example, may extend through both aligned openings. Further, although shown with a single pin which normally should provide the necessary locking strength, additional locking pins may, of course, be provided. Thus, with the inclined surface extended downwardly across the complete width of the nut opening, a plurality of pin openings and interconnecting pins could be readily employed. Other forms of lateral locking means may also be provided other than the locking pins. For example, the inner end of a pin may be formed with a self-threading thread for firm interconnection into a blind opening in the nut. A simple wedge-shaped member might be driven through an opening to engagement with the end of the shank. Further, although shown as a hex-shaped nut, the present invention may be conveniently applied to any shaped head including a socket type head. Thus, the pin 3 may be spaced inwardly sufficiently to permit forming of the nut with a suitable socket in the base portion. The end of the rod or shank is shown with a simple, inclined severed end. The end may, of course, be shaped in any suitable manner, such as a multiple stepped end to provide a similar functioning lock surface. The illustrated embodiment provides, however, a simple, inexpensive fabrication of a reliable connection. The above and similar modifications to the configurations and shape of the interconnection rod and the head with the lateral interconnecting means can be provided within the teaching of the present invention and scope of the invention as defined in the claims.

Various modes of carrying out the invention are contemplated as being within the scope of the following claims particularly pointing out and distinctly claiming the subject matter which is regarded as the invention.

I claim:

1. A bolt-type fastening unit, comprising a threaded shank having an offset end surface defining a substantially inclined end of the shank, a drive head threaded onto said shank, said head having at least one lateral opening through the side wall spaced from the opening of said head, said opening extending across and outwardly of said offset end surface, and an interlocking means fixedly extending through said opening into overlying engagement with said offset end surface to interlock the head to the shank and transmit the turning force applied to the head to the offset end surface of the shank.

2. The bolt-type fastening unit of claim 1 wherein said offset end surface is an inclined planar end surface angularly oriented to a diametrical plane through the shank.

3. The fastening unit of claim 2 wherein said head includes a second lateral opening circumferentially spaced from said one lateral opening with selected location of said interlock means in one of said first and second openings.

4. The fastening unit of claim 1 wherein drive head is a cup-shpaed member having cylindrical sidewall with internal threads corresponding to the threads of said shank, said lateral opening spaced substantially from the open end of the head.

5. The fastening unit of claim 1 wherein said interlocking means includes a rigid element fixedly secured in said opening with the inner end of the element in overlying engagement with said offset end.

6. A bolt-type fastening unit, comprising a threaded shank having an inclined planar end surface extending substantially across the end of the shank, a drive nut having an outer periphery to receive a turning tool means and threaded onto said shank, said nut having a plurality of circumferentially spaced side wall openings spaced from the axially outermost end, said openings extending across and outwardly of said planar surface, and an interlocking pin fixedly extending through at least one of said openings into overlying engagement with said planar end surface.

7. The fastening unit of claim 6 wherein drive nut is a cup-shaped member having internal threads corresponding to the threads of said shank, said lateral openings located in spaced relation to the closed end of the nut.

8. The fastening unit of claim 7 wherein said interlocking pin is fixedly secured in said opening by a press fit and with the inner end in abutting engagement with said inclined end surface.

9. The method of forming a fastening unit, comprising cutting an elongated threaded rod to a predetermined length, said cutting being created on an inclined plane angularly oriented to a diametrical plane through the rod to define an inclined end on the rod, threading a threaded nut means onto said cut end of said rod, said nut means having at least one lateral opening through the side wall spaced substantially from one end of the head, said nut means being oriented on said rod with said lateral opening extending across and outwardly of said inclined end, and inserting an interlocking means fixedly through said opening into overlying engagement with said inclined end to interlock the head to the rod and thereby transmit a turning force applied to the nut to the rod.

10. The method of claim 9 wherein said nut means including a plurality of circumferentially spaced openings in side wall portions of the nut means, and said interlocking means is a pin and inserting said pin includes forcing the pin through one of said openings to locate the inner end of the pin in abutting engagement with the inclined end of the rod and with a press fit to fixedly secure the pin to the nut means.

11. The method of claim 9 wherein said nut means including aligned openings in opposite sidewall portions of the nut means, and said interlocking means is a pin and inserting said pin includes forcing the pin through both said aligned openings into overlying engagement with the inclined end to fixedly secure the pin to the nut means.

* * * * *

UNITED STATES PATENT AND TRADEMARK OFFICE
CERTIFICATE OF CORRECTION

PATENT NO. : 4,266,460
DATED : May 12, 1981
INVENTOR(S) : Jerome R. Klimowicz

It is certified that error appears in the above-identified patent and that said Letters Patent are hereby corrected as shown below:

| | | |
|---|---|---|
| Column 3, | Line 35, | After "is" cancel "trival" and substitute therefore --- trivial ---; |
| Column 4, | Line 43, | After "a" cancel "cup-shpaed" and substitute therefore --- cup-shaped ---; |
| Column 5, CLAIM 9 | Line 15, | After "the" cancel "head" and substitute therefore --- nut means ---; |
| Column 6, CLAIM 9 | Line 2, | After "nut" insert --- means ---; |
| Column 6, CLAIM 10 | Line 4, | At beginning of sentence before "a plurality" cancel "including" and substitute therefore --- includes ---. |

Signed and Sealed this

Eighth Day of September 1981

[SEAL]

Attest:

Attesting Officer

GERALD J. MOSSINGHOFF

Commissioner of Patents and Trademarks